(12) United States Patent
Super et al.

(10) Patent No.: US 6,886,336 B2
(45) Date of Patent: May 3, 2005

(54) METHOD FOR CONTROLLING CONDENSATE FORMATION IN AN ENGINE SYSTEM

(75) Inventors: Leopold Super, Dearborn, MI (US); Richard Michael Avery, Jr., West Bloomfield, MI (US); John Edward Longnecker, Livonia, MI (US)

(73) Assignee: Detroit Diesel Corporation, Detroit, MI (US)

( * ) Notice: Subject to any disclaimer, the term of this patent is extended or adjusted under 35 U.S.C. 154(b) by 100 days.

(21) Appl. No.: 10/673,799

(22) Filed: Sep. 29, 2003

(65) Prior Publication Data

US 2005/0066659 A1 Mar. 31, 2005

(51) Int. Cl.[7] .......................... F02B 33/44; F02D 41/00
(52) U.S. Cl. ....................... 60/605.2; 123/676; 123/677
(58) Field of Search .......................... 60/605.2; 123/676, 123/677, 417, 494

(56) References Cited

U.S. PATENT DOCUMENTS

| 5,442,918 | A | * | 8/1995 | Baeuerle et al. ............... 60/602 |
| 5,564,393 | A | | 10/1996 | Asano et al. |
| 5,735,245 | A | * | 4/1998 | Kubesh et al. ............... 123/676 |
| 5,927,075 | A | | 7/1999 | Khair |
| 6,330,825 | B1 | | 12/2001 | Harness et al. |
| 6,367,256 | B1 | | 4/2002 | McKee |
| 6,487,849 | B1 | | 12/2002 | Bidner et al. |
| 6,490,856 | B2 | | 12/2002 | Bidner et al. |
| 6,575,148 | B1 | * | 6/2003 | Bhargava et al. ............ 123/564 |
| 6,651,432 | B1 | * | 11/2003 | Gray, Jr. ..................... 60/605.2 |
| 2002/0152741 | A1 | | 10/2002 | Bidner et al. |
| 2003/0034018 | A1 | * | 2/2003 | Baldwin et al. ............. 123/676 |
| 2003/0056501 | A1 | | 3/2003 | Ueno et al. |
| 2003/0192516 | A1 | * | 10/2003 | Brunemann et al. ........ 60/605.2 |

OTHER PUBLICATIONS

U.S. Appl. No. 10/627,936, filed Jul. 25, 2003, Bhargava et al.

* cited by examiner

Primary Examiner—Thai-Ba Trieu
(74) Attorney, Agent, or Firm—Brooks Kushman P.C.

(57) ABSTRACT

A method for controlling condensation in an engine. A set of signals indicative of an intake manifold temperature, intake manifold pressure, intake air temperature, intake air humidity, engine speed, and exhaust gas mask flow rate is provided. A critical value that indicates that condensation could occur is calculated. The critical value is compared to a predetermined threshold value or range. An exhaust gas recirculation valve is closed if the critical value exceeds the predetermined threshold value or range. The exhaust gas recirculation valve is opened if the predetermined threshold value or range is not exceeded.

19 Claims, 3 Drawing Sheets

METHOD FOR CONTROLLING CONDENSATE FORMATION IN AN ENGINE SYSTEM

BACKGROUND OF THE INVENTION

1. Field of the Invention

The present invention relates to a method for controlling condensate formation in an engine system, and more particularly to a method for preventing exhaust gas recirculation when conditions conducive to condensate formation are detected.

2. Background Art

Condensation is a problem associated with engine systems using exhaust gas recirculation (EGR). Engine systems employing EGR return a limited amount of engine exhaust gas to an intake manifold to combust any unused fuel and/or byproducts present in the exhaust gas. The exhaust gas is combined with fresh air provided to the engine system. The exhaust gas and/or fresh intake air may contain water vapor. Condensation may occur when hot exhaust gas is mixed with the cooler fresh air. The resulting condensate may be caustic due to the presence of compounds of nitrogen and sulfur from fuel. For example, sulphur in diesel fuel can combine with water vapor to form sulfuric acid ($H_2SO_4$). Caustic condensate can be harmful to engine system components. Therefore, it is desirable to reduce or prevent the formation of condensate in the engine system. In particular, it is desirable to stop the flow of exhaust gas back to the intake manifold when condensate is likely to form.

Prior methods for controlling condensation did not accurately predict when condensate was likely to form. As a result, these methods disabled exhaust gas recirculation unnecessarily. Moreover, prior methods did not use actual humidity measurements, such as those provided by a humidity sensor.

It is desirable to provide a method for accurately predicting when condensate is likely to form in an engine system. It is also desirable to use a humidity sensor to more accurately predict when condensate is likely to form. Furthermore, it is desirable to locate the humidity sensor where it is not subjected to extreme environmental stresses so that a cost effective sensor may be used. Problems associated with the prior art as noted above and other problems are addressed by applicant's invention as summarized below.

SUMMARY OF THE INVENTION

According to one aspect of the present invention, a method for controlling condensation in an engine system is provided. The engine system has an engine that includes intake and exhaust manifolds. An exhaust gas recirculation valve is provided that regulates the amount of exhaust gas recirculated from the exhaust manifold to the intake manifold. The method comprises the steps of providing a set of signals indicative of the operating state of the engine system. A critical value indicative of the potential for condensation in the intake manifold is calculated as a function of the set of signals. The critical value is compared to a threshold value. If the critical value exceeds the threshold value, then the exhaust gas recirculation valve is closed. If the critical value does not exceed the threshold value, then the exhaust gas recirculation valve is opened. Alternately, the exhaust gas recirculation valve may not be closed unless the critical value exceeds the threshold value for a set period of time.

Likewise, the exhaust gas recirculation valve may not be opened unless the critical value does not exceed the threshold value for a set period of time.

According to another aspect of the invention, a method for controlling condensation in a vehicle is provided. The vehicle has an engine system and a turbocharger selectively powered by exhaust gas from the exhaust manifold. The turbocharger is adapted to provide compressed air to the intake manifold. The method includes the steps of calculating a value called IMT Critical, which is the temperature at which condensation will occur, as a function of first, second, third, fourth, fifth, and sixth signals and determining whether the IMT Critical value exceeds a threshold value. If IMT Critical exceeds the threshold value, then the exhaust gas recirculation valve is closed. If IMT Critical does not exceed the threshold value, then the exhaust gas recirculation valve is opened.

The exhaust gas recirculation valve may not be closed unless IMT Critical exceeds the threshold value for a predetermined period of time or a predetermined number of iterations. The exhaust gas recirculation valve may not be opened unless IMT Critical does not exceed the threshold value for a predetermined period of time or a predetermined number of iterations.

The first signal may be indicative of an intake manifold temperature and may be provided by a temperature sensor located near the intake manifold. The second signal may be indicative of an intake manifold pressure and may be provided by a pressure sensor located near the intake manifold. The third signal may be indicative of an engine speed and may be provided by an engine control module. The fourth signal may be indicative of air humidity and may be measured in an air inlet conduit. The fifth signal may be indicative of an air temperature and may be provided by a temperature sensor located in the air inlet conduit. The sixth signal may be indicative of the mass flow rate of exhaust gas recirculated to the intake manifold.

DETAILED DESCRIPTION OF THE PREFERRED EMBODIMENT(S)

Figure 1:
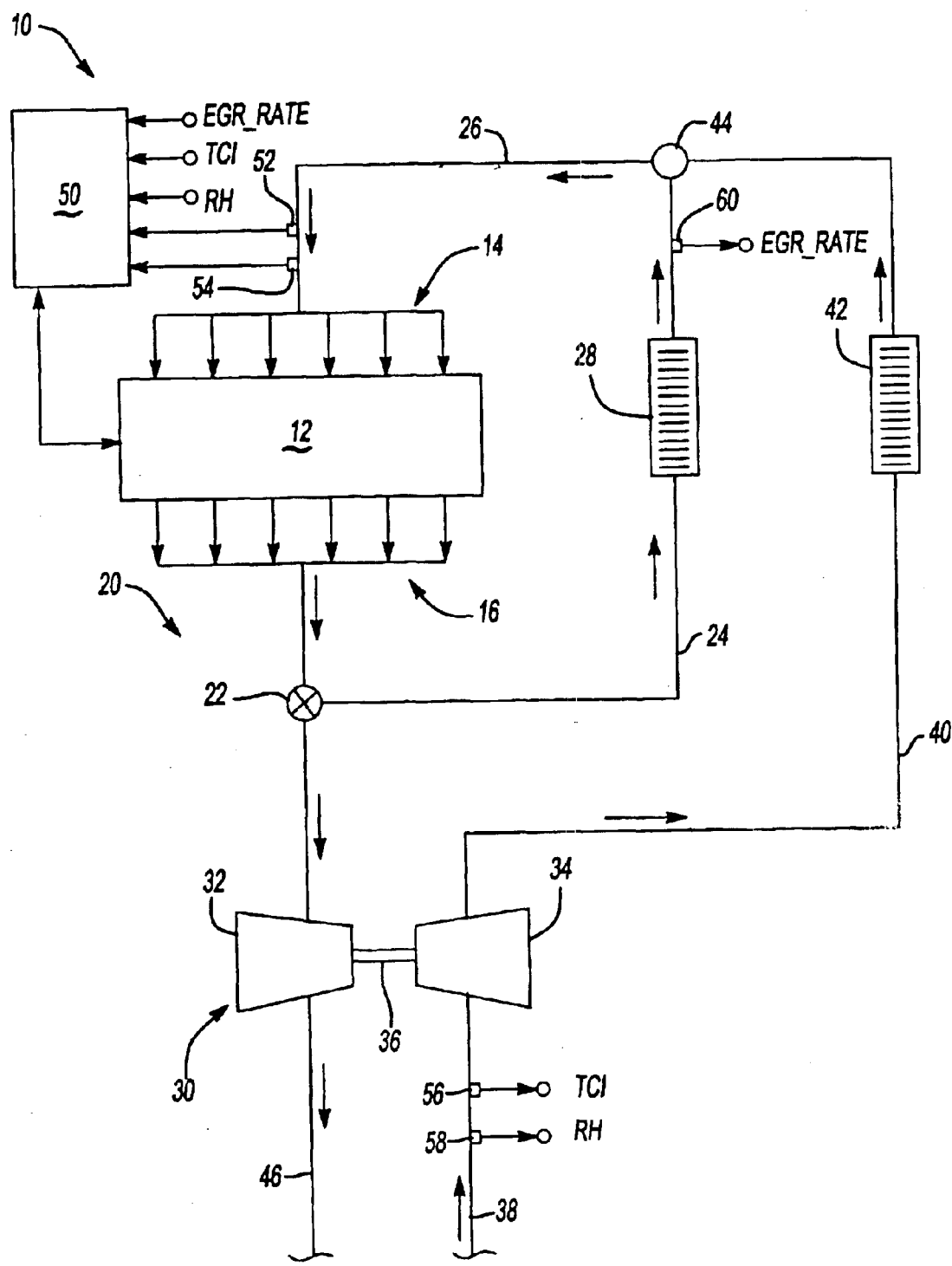
FIG. 1 is a schematic of an engine system using exhaust gas recirculation.

Referring to FIG. 1, a schematic of an engine system 10 is shown. As will be appreciated by those of ordinary skill in the art, the engine system 10 may be used in a wide variety of equipment such as trucks, construction equipment, marine vessels and stationary generators. Moreover, it should be noted that the present invention is not limited to a particular type of engine or fuel. In addition, the flow of gases in the engine system 10 is generally denoted by freestanding arrows in FIG. 1.

The engine system 10 includes an engine 12. The engine 12 may be an internal combustion engine and may have a plurality of cylinders. In the embodiment shown in FIG. 1, the engine 12 includes an intake manifold 14 and an exhaust manifold 16. The intake manifold 14 provides gases, such as air and/or exhaust gas to the engine 12 for combustion. The exhaust manifold 16 receives gases from the engine 12 after combustion.

In a vehicular application, the engine 12 may be connected to a transmission that is adapted to drive vehicle traction wheels. For example, an output shaft of the transmission is connected to a driveshaft. The driveshaft is connected to a differential that is connected to a pair of axles that are each connected to a vehicle wheel. Engine torque is transmitted through the transmission, differential, and axles to turn the vehicle traction wheels.

The engine system 10 also includes an exhaust gas recirculation (EGR) system 20. The EGR system 20 dilutes the fuel charge entering the engine and lowers combustion temperatures to reduce the levels of oxides of nitrogen. The EGR system 20 is also adapted to recirculate exhaust gas from the exhaust manifold 16 to the intake manifold 14. Specifically, the EGR system 20 includes an EGR valve 22 that redirects all, some, or none of the exhaust gas from the exhaust manifold 16 to the intake manifold 14 via conduit 24 as will be discussed in more detail below. Optionally, the EGR system 20 may include an EGR cooler 28 disposed in conduit 24.

The engine system 10 may include a turbocharger 30. The turbocharger 30 includes a turbine 32 and a compressor 34. In the embodiment shown in FIG. 1, the turbine 32 is connected to the compressor 34 by a drive shaft 36. The pressure of the engine exhaust gas causes the turbine 32 and compressor 34 to spin when gases are provided to the turbine 32 by the EGR valve 22. The compressor 34 compresses air provided by an air inlet conduit 38. The compressed air from the compressor 34 is provided to the intake manifold 14 by conduits 40 and 26. The compressed air creates turbo boost pressure which develops increased engine power during combustion. Optionally, an intercooler 42, also called a charge air cooler, may be disposed in conduit 40. It should be noted that the present invention could be used with any suitable air compression device, such as a supercharger.

The flow of exhaust gas in the engine system 10 will now be described in more detail. The EGR system 20 provides a metered portion of exhaust gas to the intake manifold 14. Specifically, the amount of exhaust gas to be recirculated is controlled by the EGR valve 22. A mixer 44 combines the exhaust gas selectively routed through conduit 24 by the EGR valve 22 with the compressed air in conduit 40. Air exiting the mixer 44 is provided to the intake manifold 14 by conduit 26. The remaining exhaust gas not diverted by the EGR valve 22 passes through the turbine 32. The exhaust gas exiting the turbine 32 passes through an exhaust pipe 46 that may include a muffler (not shown) before being exhausted to the atmosphere.

The engine system 10 also includes a control module 50. The control module 50 is used to monitor and control various aspects of the engine system 10. For example, the control module 50 is connected to the engine 12 to monitor and control its operation and performance. The control module 50 also processes inputs from various components. These components may include a pressure sensor 52 and a temperature sensor 54. Sensors 52 and 54 may be disposed in any suitable location, such as at or near the intake manifold 14.

The control module 50 may also be connected to a temperature sensor 56, a humidity sensor 58, and a mass flow sensor 60. The temperature sensor 56 and the humidity sensor 58 may be disposed in any suitable location, such as in the air inlet conduit 38. Optionally, the temperature and humidity sensors 56, 58 may be combined into a single sensor or sensor module. The mass flow sensor 60 may be disposed in conduit 24 to provide a signal indicative of the mass flow rate of the recirculated exhaust gas. For clarity, in FIG. 1 the connections between the control module 50 and sensors 56, 58 and 60 are denoted by references TCI, RH, and EGR_Rate, respectively.

The temperature sensors 54, 56 may be of any suitable type, such as a thermistor or thermocouple. Likewise, the pressure sensor 52 may be of any suitable type, such as a pressure switch.

Figure 2:
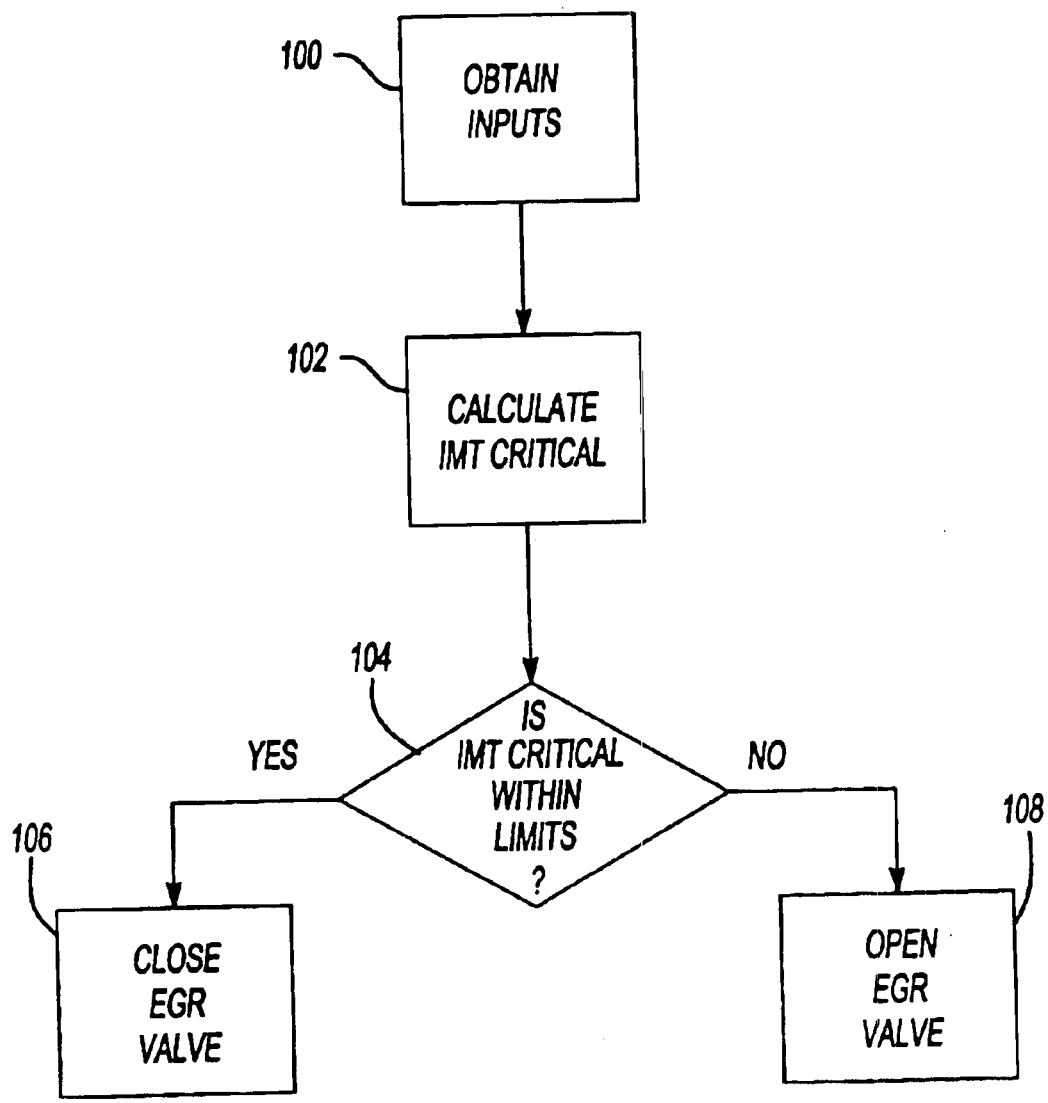
FIG. 2 is a flowchart of a method for controlling exhaust gas recirculation in the engine system.

Referring to FIG. 2, a flowchart of a method for controlling condensation is shown. As will be appreciated by one of ordinary skill in the art, the flowchart represents control logic which may be implemented or effected in hardware, software, or a combination of hardware and software. For example, the various functions may be effected by a programmed microprocessor, such as that included in the DDEC controller manufactured by Detroit Diesel Corporation, Detroit, Mich. The control logic may be implemented using any of a number of known programming and processing techniques or strategies and is not limited to the order or sequence illustrated. For instance, interrupt or event-driven processing is typically employed in real-time control applications, such as control of an engine or vehicle rather than a purely sequential strategy as illustrated. Likewise, parallel processing, multi-tasking, or multi-threaded systems and methods may be used to accomplish the objectives, features, and advantages of the present invention.

The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In one embodiment of the present invention, the method may be executed by the control module 50. Moreover, the method may be enabled or disabled based the operating state of the engine system 10 and/or current environmental conditions. For example, the execution of the method may be disabled if the ambient air temperature is below a threshold temperature.

At 100, the flowchart begins by obtaining inputs indicative of the current operating conditions of the engine system 10. Input signals may be provided to the control module 50 by the engine 12 and sensors 52, 54, 56, 58, and 60. Moreover, a signal from a humidity sensor 58 not located adjacent to the intake manifold 14 may be employed.

At 102, the input signals are used to calculate a value called IMT Critical. IMT Critical is the temperature at which condensation will occur in the intake manifold for a given set of operating conditions. IMT Critical is calculated with the following equation:

$$IMT\ Critical = (A*RPM) + (B*IMP) + (C*EGR\_Rate) +$$
$$(D*TCI) + (E*IMT) + (F*RH) + (G*TCI*IMT*RH) + H +$$
$$I*(IMT^2) + J*(RH^2) + (K*RPM*EGR\_Rate) + (L*IMP*TCI) +$$
$$(M*EGR\_Rate*RH) + (N*TCI*IMT) + (O*TCI*RH) +$$
$$(P*IMT*RH)$$

where:

A through P=constants
IMP=intake manifold pressure (in psi)
IMT=intake manifold temperature (in degrees R)
EGR_Rate=EGR mass flow rate (in kg/min)
RH=relative humidity (in percent)
RPM=current engine speed (in revolutions per minute)
TCI=air inlet temperature (in degrees R)

The values of coefficients A through P may be based on assessments of engine system performance. For example, computer modeling or empirical data from engine system testing may be employed to determine the physical relationships between each equation term and IMT Critical. Such engine system assessments yield the following equation:

$$IMT\ Critical = (0.072854*RPM) + (14.302*IMP) +$$
$$(47.075*EGR\_Rate) + (28.531*TCI) + (30.036*IMT) +$$
$$(106.298*RH) + (0.0004656*TCI*IMT*RH) + 3995.9 +$$
$$0.044326*(IMT^2) + 0.010043*(RH^2) +$$
$$(0.019019*RPM*EGR\_Rate) + (0.033069*IMP*TCI) +$$
$$(0.07287*EGR\_Rate*RH) + (0.045588*TCI*IMT) +$$
$$(0.228799*TCI*RH) + (0.213188*1MT*RH)$$

At 104, IMT Critical is compared to at least one predetermined limit or threshold value to determine if condensation is likely to occur. If condensation is likely to occur, then the method continues at block 106 where the EGR valve 22 is closed to prevent the flow of exhaust gas to the intake manifold 14, thereby inhibiting condensation. If condensation is unlikely to occur, then the EGR valve 22 is opened at block 108.

The predetermined limit(s) or threshold value(s) may be presented as a single value or as a range. For example, condensation may be likely to occur if the calculated value of IMT Critical is within the predetermined limits or if IMT Critical is less than a threshold value.

Figure 3:
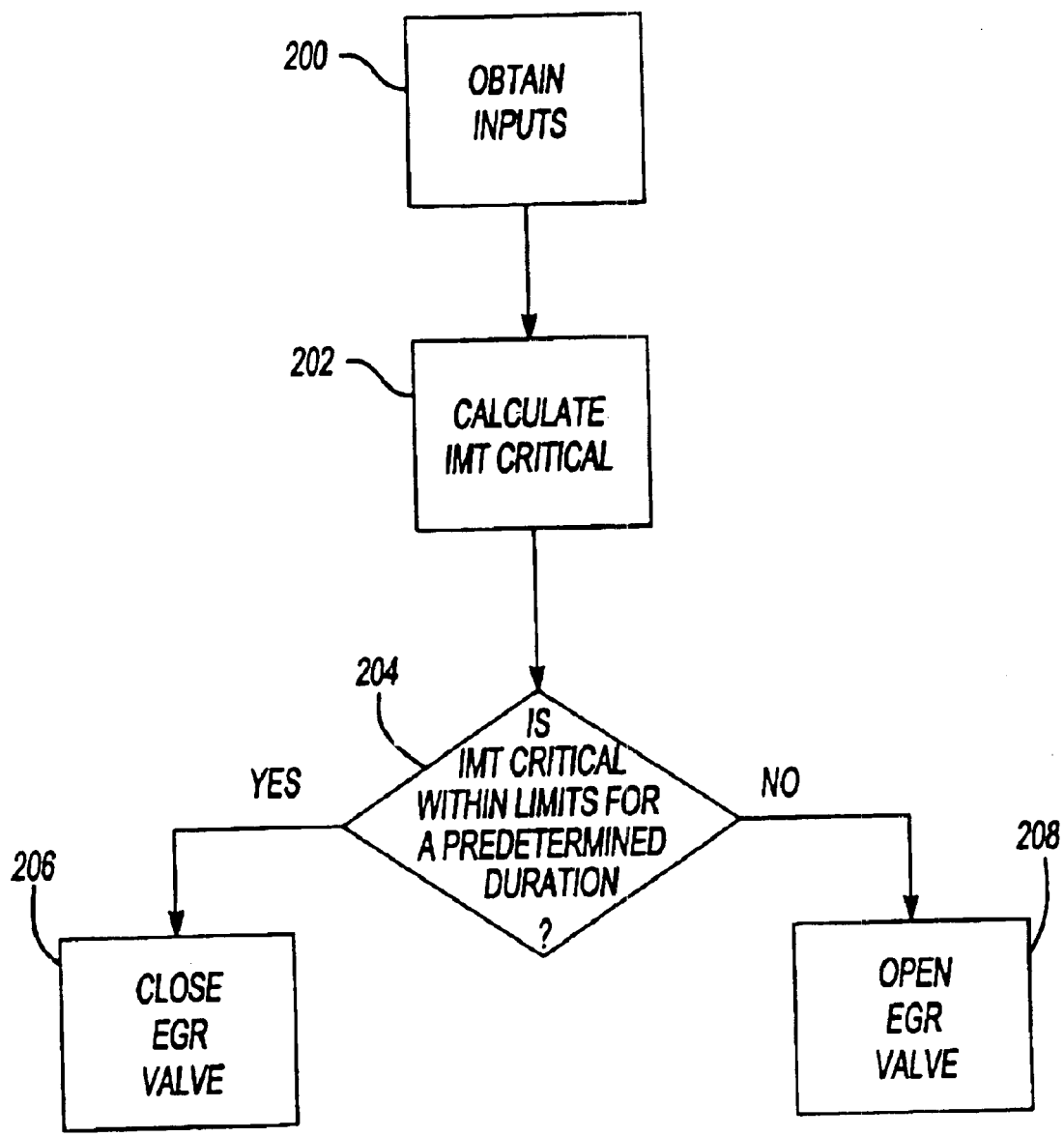
FIG. 3 is a flowchart of an alternate embodiment of the method for controlling exhaust gas recirculation in the engine system.

Referring to FIG. 3, an alternate embodiment of the present invention is shown. This embodiment prevents actuation of the EGR valve 22 if the value of IMT Critical does not continuously exceed or remain within the predetermined limits for a predetermined duration. As such, this embodiment prevents cycling of the EGR valve 22 until IMT Critical obtains a "stable" condition where it is not alternating in and out of the predetermined limits. Inhibiting cycling reduces the wear on the valve and associated engine system components.

At 200, the flowchart begins by obtaining inputs indicative of the current operating conditions of the engine system 10. The input signals are the same as those discussed previously in reference to FIG. 2. At 202, an IMT Critical value is calculated in the same manner as previously described. At 204, IMT Critical is compared to at least one predetermined limit value. Specifically, the value of IMT Critical is compared to the limit value more than once to assess whether IMT Critical remains within the predetermined limits for a predetermined duration. The predetermined duration may be a predetermined period of time or number of iterations. A timer may be used to measure the predetermined duration. For example, the timer may allow the method to repeat for a predetermined duration to determine whether the calculated value of IMT Critical is stable. In addition, the value of IMT Critical may be assessed at the beginning and end of the time period or repeatedly throughout the time period to determine whether IMT Critical has remained within the predetermined limits. The predetermined duration may also be realized by repeatedly calculating IMT Critical values and comparing these values to the predetermined limits for a set number of iterations.

As with the previous embodiment, if condensation is likely to occur, the method continues at block 206 where the EGR valve 22 is closed to inhibit condensation. Returning to 204, if the calculated value of IMT Critical is not within the predetermined limits, condensation is unlikely to occur and the EGR valve 22 is opened at block 208.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling condensation in an engine system, the engine system having an engine including an intake manifold and an exhaust manifold, an exhaust gas recirculation valve that regulates an amount of exhaust gas recirculated from the exhaust manifold to the intake manifold, a first signal indicative of an intake manifold temperature, a second signal indicative of an intake manifold pressure, a third signal indicative of an engine speed, a fourth signal indicative of an air humidity, a fifth signal indicative of an air temperature, and a sixth signal indicative of a mass flow rate of exhaust gas recirculated to the intake manifold, the method comprising the steps of:

calculating as a function of the first, second, third, fourth, fifth and sixth signals a critical value indicative of the potential for condensation in the intake manifold;

determining whether the critical value exceeds a threshold value indicative of the point at which condensation will occur in the intake manifold; and closing the exhaust gas recirculation valve if the threshold value is exceeded for a set period of time.

2. The method of claim 1 further comprising the step of opening the exhaust gas recirculation valve if the threshold value is not exceeded.

3. The method of claim 2 wherein the exhaust gas recirculation valve is not opened unless the critical value does not exceed the threshold value for a set period of time.

4. The method of claim 1 wherein the critical value is determined as a function of the expression $$(A*RPM) + (B*IMP) + (C*EGR\_Rate) + (D*TCI) + (E*IMT) + (F*RH) +$$
$$(G*TCI*IMT*RH) + H + (I*(IMT^2)) + (J*(RH^2)) +$$
$$(K*RPM*EGR\_Rate) + (L*IMP*TCI) + (M*EGR\_Rate*RH) +$$
$$(N*TCI*IMT) + (O*TCI*RH) + (P*IMT*RH)$$

where:
   IMP is the intake manifold pressure,
   IMT is the intake manifold temperature,
   EGR_Rate is the mass flow rate of the exhaust gas recirculated to the intake manifold,
   RH is the air humidity,
   RPM is the engine speed,
   TCI is the air temperature, and
   A, B, C, D, E, F, G, H, I, J, K, L, M, N, O, and P are constants.

5. The method of claim 1 wherein the first signal indicative of the intake manifold temperature is provided by a temperature sensor disposed proximate the intake manifold.

6. The method of claim 1 wherein the second signal indicative of the intake manifold pressure is provided by a pressure sensor disposed proximate the intake manifold.

7. The method of claim 1 wherein the third signal indicative of the engine speed is provided by an engine control module.

8. The method of claim 1 wherein the fourth signal indicative of the air humidity is measured in an air inlet conduit that provides air to the compressor.

9. The method of claim 1 wherein the fifth signal indicative of an air temperature is provided by a temperature sensor located in an air inlet conduit that provides air to the compressor.

10. A method for controlling condensation in a vehicle, the vehicle having an engine system, the engine system including an internal combustion engine, intake and exhaust manifolds coupled to the engine, a turbocharger selectively powered by an exhaust gas from the exhaust manifold and adapted to provide compressed air to the intake manifold, an exhaust gas recirculation valve that regulates an amount of exhaust gas recirculated from the exhaust manifold to the intake manifold, a first signal indicative of an intake manifold temperature, a second signal indicative of an intake manifold pressure, a third signal indicative of an engine speed, a fourth signal indicative of an air humidity, a fifth signal indicative of an air temperature, and a sixth signal indicative of a mass flow rate of the exhaust gas recirculated from the exhaust manifold to the intake manifold, the method comprising the steps of:

calculating as a function of the first, second, third, fourth, fifth, and sixth signals an IMT Critical value indicative of the potential for condensation in the intake manifold;

determining whether the IMT Critical value exceeds a threshold value indicative of the point at which condensation will occur in the intake manifold; and closing the exhaust gas recirculation valve if the threshold value is exceeded.

11. The method of claim 10 wherein the exhaust gas recirculation valve is not closed unless the IMT Critical value exceeds the threshold value for a predetermined period of time.

12. The method of claim 10 wherein the exhaust gas recirculation valve is not closed unless the IMT Critical value exceeds the threshold value for a predetermined number of iterations.

13. The method of claim 10 further comprising the step of opening the exhaust gas recirculation valve if the IMT Critical value does not exceed the threshold value.

14. The method of claim 13 wherein the exhaust gas recirculation valve is not opened unless the IMT Critical value does not exceed the threshold value for a predetermined period of time.

15. The method of claim 13 wherein the exhaust gas recirculation valve is not opened unless the IMT Critical value does not exceed the threshold value for a predetermined number of iterations.

16. A method for controlling condensation in a vehicle, the vehicle having an engine system, the engine system including an engine having an intake manifold, a gas compression device adapted to provide a compressed gas to the intake manifold, an exhaust gas recirculation valve that regulates an amount of exhaust gas recirculated to the intake manifold, and a set of signals indicative of the operating state of the engine system, the method comprising the steps of:

providing the set of signals indicative of intake manifold temperature, intake manifold pressure, intake air temperature, intake air humidity, and exhaust gas mass flow rate;

determining a critical value indicative of condensation in the intake manifold;

comparing the critical value to a predetermined range;

actuating the exhaust gas recirculation valve toward a closed position if the critical value is within the predetermined range for a set period of time; and actuating the exhaust gas recirculation valve toward an open position if the critical value is outside the predetermined range.

17. The method of claim 16 wherein the exhaust gas recirculation valve is not actuated toward the open position unless the critical value is outside the predetermined range for a set period of time.

18. The method of claim 16 wherein a humidity signal indicative of intake air humidity is provided by a humidity sensor located in an air inlet conduit.

19. The method of claim 18 wherein the humidity signal and the temperature signal indicative of intake air temperature are provided by a sensor module located in the air inlet conduit.

* * * * *